Figure 1:
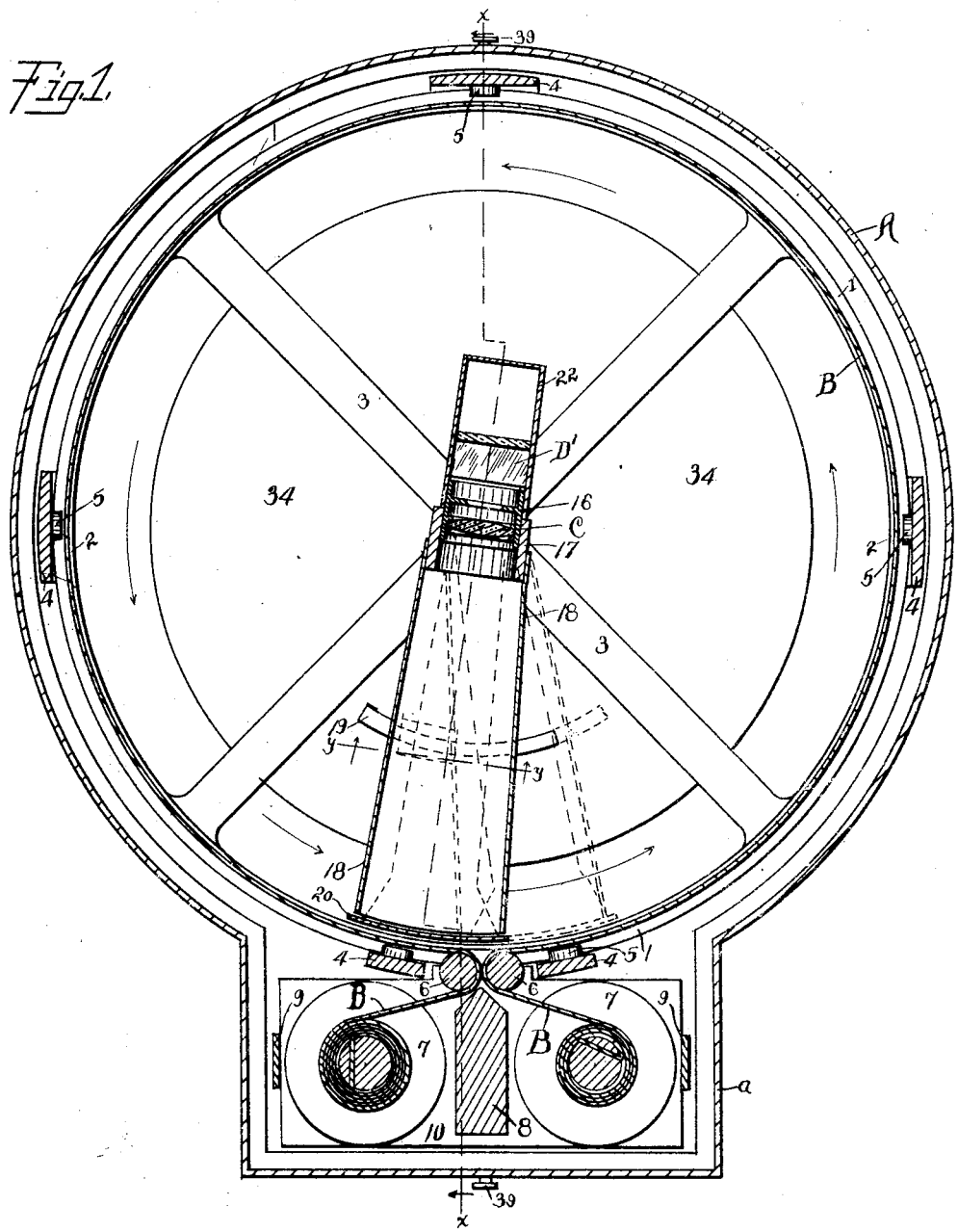

No. 687,592. Patented Nov. 26, 1901.
D. O. BARNELL.
PANORAMA CAMERA.
(Application filed Jan. 30, 1901.)

(No Model.) 3 Sheets—Sheet 1.

WITNESSES: Edwin C. Baird, John Zweifel

INVENTOR David O. Barnell
BY Mason Fenwick Lawrence ATTORNEYS

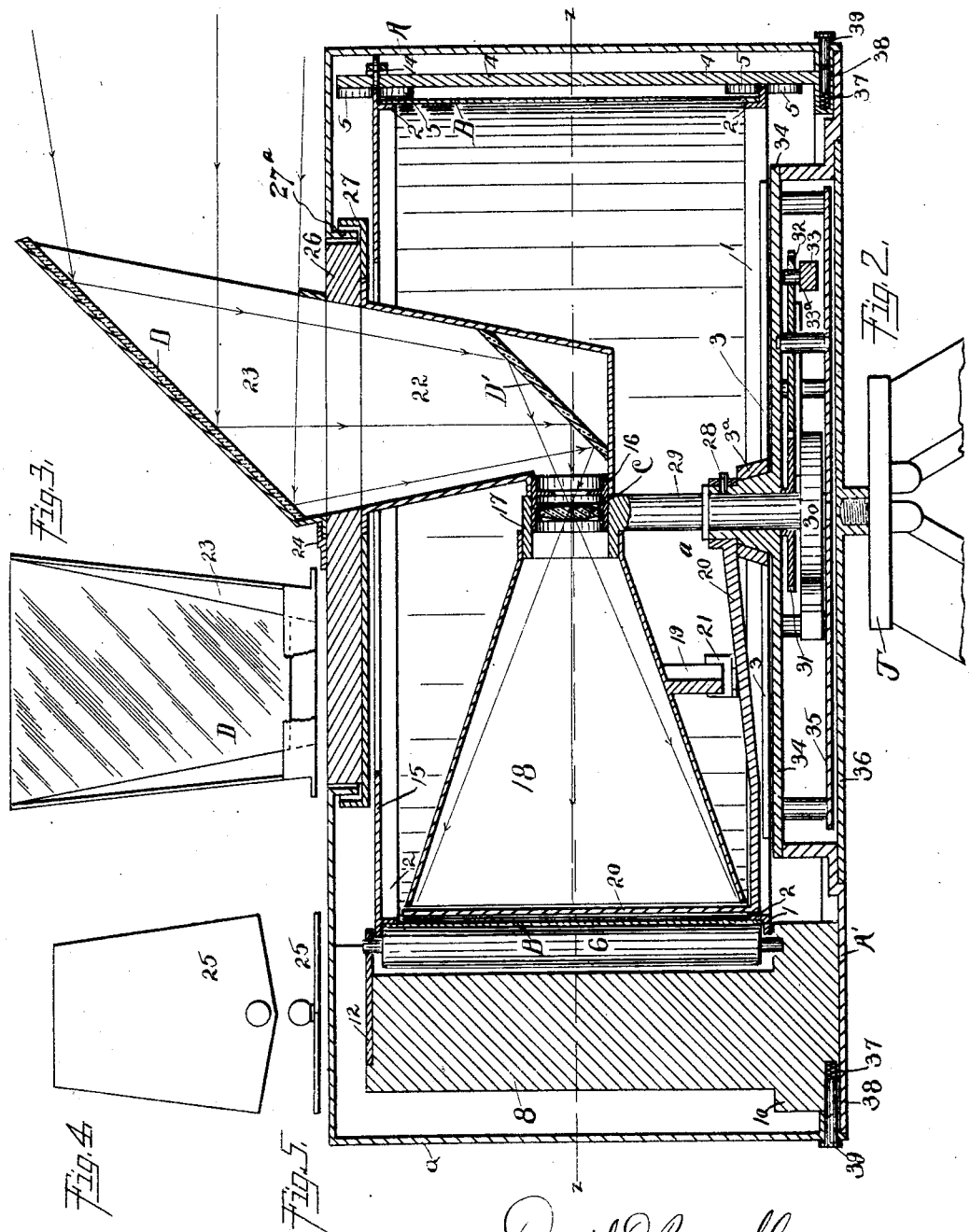

No. 687,592. Patented Nov. 26, 1901.
D. O. BARNELL.
PANORAMA CAMERA.
(Application filed Jan. 30, 1901.)
(No Model.) 3 Sheets—Sheet 3.
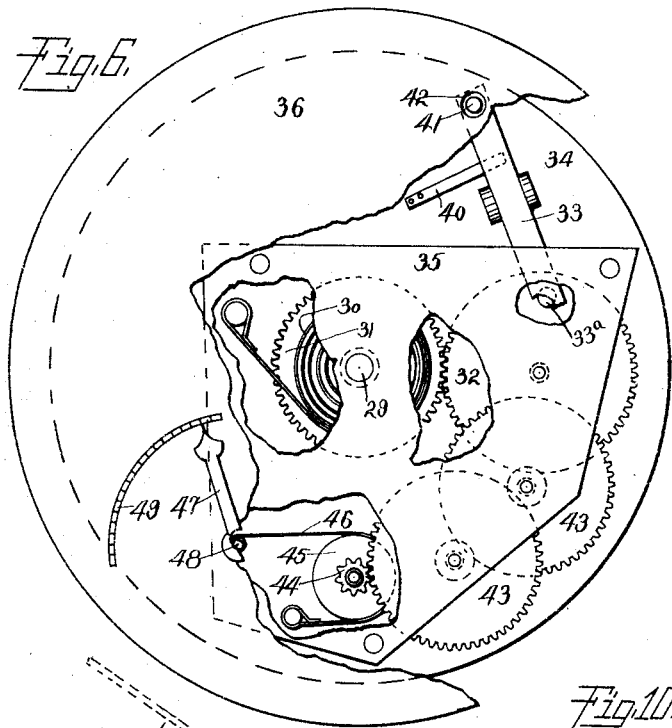
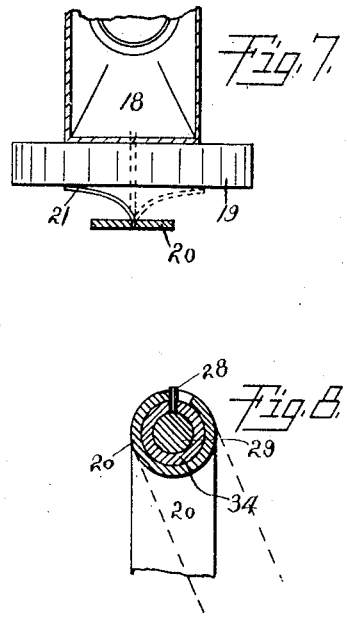
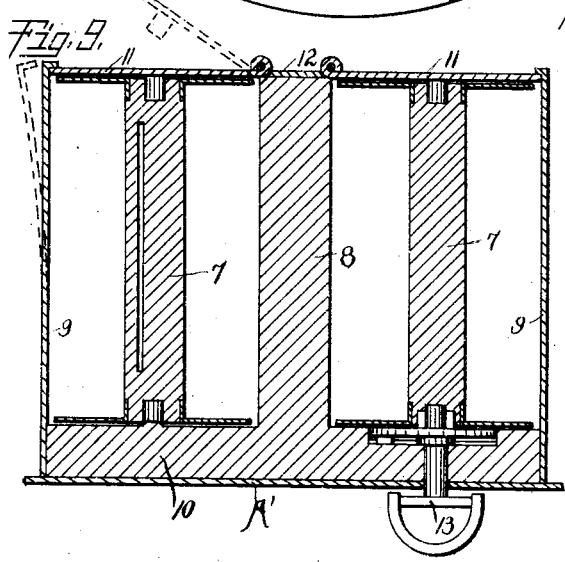
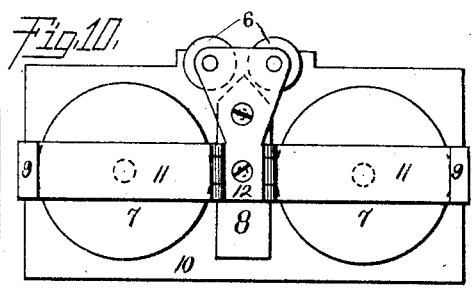
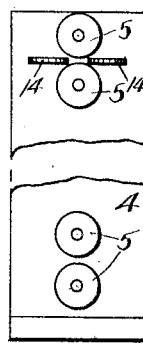
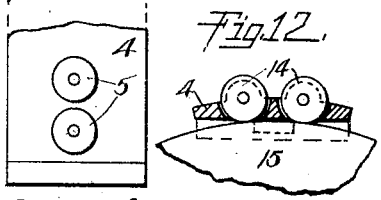
WITNESSES: David O. Barnell INVENTOR
BY
ATTORNEYS.

United States Patent Office.

DAVID O. BARNELL, OF OMAHA, NEBRASKA, ASSIGNOR TO THE COSMOS MANUFACTURING COMPANY, OF BROOKLINE, MASSACHUSETTS, A CORPORATION OF MASSACHUSETTS.

PANORAMA-CAMERA.

SPECIFICATION forming part of Letters Patent No. 687,592, dated November 26, 1901.

Application filed January 30, 1901. Serial No. 45,298. (No model.)

*To all whom it may concern:*

Be it known that I, DAVID O. BARNELL, a citizen of the United States, residing at Omaha, in the county of Douglas and State of Nebraska, have invented certain new and useful Improvements in Panorama-Cameras; and I do hereby declare the following to be a full, clear, and exact description of the invention, such as will enable others skilled in the art to which it appertains to make and use the same.

My invention relates to improvements in cameras, and particularly to that class of cameras known as "panoramic" cameras.

It consists in a camera provided with a suitable inclosing casing, means for holding a film in proper position, and a lens mounted within said casing so as to make a complete revolution therein for transmitting rays of light from every point of the horizon to the film exposed.

It also consists in a camera provided with means for holding a film or other sensitized material in a circular form, a lens for directing rays of light to the whole circle of film, and reflecting means for directing light received from the horizon to and through the said lens.

It further consists in certain other novel constructions and arrangements of parts, as will be hereinafter fully described and claimed.

In the accompanying drawings, Figure 1 is a central horizontal section through a camera constructed in accordance with the present invention and taken upon the line $z\ z$ of Fig. 2. Fig. 2 is a central vertical section taken upon the line $x\ x$ of Fig. 1. Fig. 3 is a side elevation of one of the mirrors employed in my improved camera. Figs. 4 and 5 are details in plan and edge elevation of a slide for closing the aperture ordinarily covered by the said mirror. Fig. 6 is a plan view of the casing carrying the lens-actuating mechanism, a portion of the said casing being broken away to better reveal the parts. Fig. 7 is a detail sectional view illustrating the means of operating the shutter of the camera. Fig. 8 is a detail sectional view illustrating the means for limiting the movement of the shutter. Fig. 9 is a vertical central section through the mechanism for holding the film-spools. Fig. 10 is a top plan view of the same. Figs. 11 and 12 are details showing the antifriction means employed for holding the film-supporting plates in position.

Panoramic cameras have been heretofore made and used, but they usually cover only a portion of the horizon in their operation. My improved camera is designed to supply a mechanism of this character which shall be capable of receiving reflections and producing impressions upon sensitized surfaces from every point of the horizon.

In carrying out the features of this invention I employ a casing A for inclosing the apparatus of the camera, the said casing being cylindrical in shape for the most part, with an offset or projection, as $a$, for holding the sensitive-film spools.

In a camera of this character I employ a flexible sensitized material, such as the films in common use, and support a portion of the said film B in the camera A upon revoluble plates, as 1 and 15. The plates are arranged concentrically within the cylindrical casing A, one above the other, being separated sufficiently to just receive the film B between them. Each of the plates 1 and 15 is provided with an inwardly-extending peripheral flange 2 2, against which the edges of the film B rest. These flanges serve to hold the film in a circular form and afford a means for easily carrying the same around within the camera. The lower plate 1 is preferably secured by means of radiating spokes or arms 3 3 to a hub 3ª, which finds a suitable bearing upon a central boss formed upon a supporting-plate 34, mounted upon the bottom A' of the camera. The upper plate 15 is movably supported upon a series of standards 4 4, arranged at suitable intervals around the outer edge of the casing A. Each of these standards is provided with pairs of antifriction-rollers 5 5, adapted to receive between them the outer edge or periphery of the said plate 15. By this means the plate is so supported that it is free to revolve with the sensitive film. One or more of the posts are provided with a pair of horizontal antifriction-rollers 14 14, adapted to engage the edge of the plate 15 to prevent any binding action of this plate, which has no other centering mechanism. The position of these rollers 14 14 and their relation to the rollers 5 5 will be clearly understood by reference to Figs. 11 and 12 in the drawings. The plate 15 is provided with a central opening of considerable size to accommodate the reflecting mechanism for transmitting the light-rays to the interior of the camera.

The film B is preferably mounted upon rolls or spools, as 7 7, which are arranged outside the peripheries of the plates 1 and 15. These spools are revolubly mounted upon a frame comprising a base 10 and having a central standard 8 projecting upwardly between the spools 7 7. In order to hold the spools in position upon the base 10, I secure a plate 12 to the top of the standard 8 and hinge to the same the plates 11 11 in such a manner that they may be folded down over the ends of the spools 7 7. The outer ends of the plates 11 are adapted to be caught and held in their folded positions by means of springs 9 9, which project upwardly from the base 10. The action of these springs for releasing the plates 11 11 when the spools are to be changed is indicated in dotted lines in Fig. 9. Spool-centering means are secured to the base 10 and each of the plates 11, as seen in said Fig. 9. One of the spools 7 is adapted to be engaged by an actuating-key 13, so that the said spool may be rotated from the outside of the camera in the usual manner. The film B passes from one of the spools 7 about a vertical roller 6 to the periphery of the plates 1 and 15, thence around the annular flanges 2 2 of said plates, and completely around the camera until it reaches a second vertical roller 6, after which it passes to the other spool 7. The two vertical rollers 6 6 are preferably arranged as closely together as practical without causing the portions of the film which pass between them to rub against each other. The rollers 6 6 may be journaled at their lower ends in the block 10 and at their upper ends in an enlargement of the plate 12 upon the upper end of the standard 8. This arrangement makes it possible to hold a loop of the film in a circular position within the camara, so that a revolving lens mounted within the said loop may be caused to affect the said film upon a complete rotation of the said lens upon its axis.

Within the camera and inside the loop of the film I arrange a suitable image-transmitting device comprising a lens C and reflecting apparatus connected therewith. The lens C is secured within an eye 17, formed upon the upper end of the vertical shaft 29. This shaft 29 finds a bearing in the central boss of the supporting-plate 34. Secured to the eye 17 upon one side of the lens C is a flaring tube 18, which is made slightly smaller at its outer end than the exposed surface of the film B. This tube 18 is adapted to direct the rays of light passing through the lens to the different portions of the film-surface exposed successively as the lens is revolved upon its axis. Upon the other side of the lens C is arranged a flaring tube 22, which is formed with an elbow and passes upwardly to the top of the camera, where it is secured to a revolving block 26. The block 26 is provided with a circular plate having a projecting peripheral flange 27, adapted to inclose a flange $27^a$, which extends inwardly from the top of the camera. The block 26 is circular in contour and fits within the aperture in the top of the camera formed by the said flange $27^a$. Upon the upper side of the block 26 is removably mounted an extension-tube 23, forming a prolongation of the tube 22 and carrying a reflecting-surface D. The said extension-tube 23 is formed with a flange at its lower edge adapted to be slipped into a retaining-groove formed by the plate 24, which is secured to the upper surface of the block 26. The tubes 22 and 23 are provided with any suitable reflecting means—such as mirrors, prisms, and the like—for receiving images from outside the camera and transmitting them to the lens within the camera. A simple arrangement of these parts is illustrated in Fig. 2 of the drawings, in which an inclined mirror D is mounted in the top of the extension-tube 23, while a second mirror D′ is arranged in the elbow portion of the tube 22. These mirrors D and D′ are so arranged as to receive reflections from the horizon and divert the same into the center of the camera and then transmit them to the lens C. The lens C will in turn direct the image to the inner surface of the sensitive film B. By revolving the lens and the tubes 18 to 22 a continuous reflection may be brought to bear upon the inwardly-facing sensitive surface of the film B, and thus a picture representing the full sweep of the horizon may be obtained. The interlocking flanges 27 and $27^a$ provide for the revolution of the block 26 and the mirrors D and D′ without danger of admitting light through the joint thus formed.

I contemplate employing any suitable mechanism for rotating the lens C and have illustrated a simple means for this purpose in the drawings. The lower end of the shaft 29 is projected a suitable distance below the plate 34 and is attached to an actuating-spring 30, mounted upon a suitable framing 35. One end of the said spring is secured to a standard on the said framing, while the other end of the said spring is fastened to the shaft 29. The shaft 29 also carries a gear or spur wheel 31, which meshes with a gear-wheel 32, mounted upon a suitable arbor in the framing 35. This gear-wheel 32 is adapted to transmit motion to a small pinion 44 through an intermediate train of gearing 43 43. The pinion 44 has secured to it a brake wheel or disk 45. Around the brake-disk 45 I pass a flexible band 46, which is secured at one end to a stud or standard on the framing 35 and at the other end to a shaft 48, about which it may be partially wound. The shaft 48 is provided with an adjusting-arm 47, which has a pointer formed upon its ends adapted to travel over a scale 49. By moving the arm 47 to different points along the said scale the band 46 may be maintained at such a tension that the speed of the shaft 29 through the gearing just described can be regulated to make exposures upon the film of proper duration.

In the use of a revolving lens such as that above described it is necessary to have a suitable shutter and one which may accommodate itself to some extent to the movement of the said lens. I preferably use a shutter 20 made of sufficient width to cover the end of the tube 18 and protect the film from the action of light transmitted through said tube until it is desired to produce an exposure. The shutter 20 is carried by the outer end of an arm $20^a$, which finds a bearing upon the central boss of the plate 34. The movement of the said arm is preferably limited by a pin 28, which is secured to the central boss of the plate 34, the said pin engaging an elongated slot formed in the sleeve bearing upon the end of the said arm 28. The movement of the shutter is comparatively slight and need only be to the extent indicated in dotted lines in Fig. 1. The shutter closes the end of the tube 18 before the lens starts upon its revolution. When the lens leaves the shutter, it makes a complete revolution in the camera before it comes around to the same again. The arm $20^a$ is provided with an upwardly-extending spring 21, adapted to be engaged by a segmental piece 19, secured to the under side of the tube 18. As the tube 18 approaches the shutter 20 the end of the piece 19 will engage the spring 21, the said spring being sufficiently strong to move the shutter to the limit of its motion before yielding beneath the continued movement of the piece 19. The shutter and the tube 18 will then reach the position shown in dotted lines in Fig. 1. By the use of this shutter the film will have been exposed from one roller 6 all the way around the camera to the other roller 6, the movement of the said shutter making this possible. It will be seen that the lens and the shaft carrying the same have to make a little more than a complete revolution.

In order to set the lens-actuating mechanism and release the same at the proper time, I provide the gear-wheel 32 with an aperture adapted to be engaged by a pin $33^a$, which is carried by the end of a lever 33. The lever 33 is mounted in the framing 35 and is normally held in engagement with the apertured geared wheel 32 by a spring 40. The outer end of the lever 33 carries a pin 41, which extends through an aperture 42, formed in the bottom plate 36 of the camera. In setting the lens the spring 30 is wound by turning the shaft 29 until the pin $30^a$ is brought into engagement with the aperture in the gear 32. The mechanism will then be in position ready for an exposure. By pressing the pin 41 inwardly the gearing can be released from the pin $33^a$, and the lens, together with the tubes 18 and 32, will be caused to revolve within the camera. When the shaft 29 is turned so as to wind up the spring 30, the shutter 20 will be brought to the position shown in Fig. 1.

The extension-tube 23, with the mirror D carried thereby, is preferably removed when the camera is not in use, and the opening in the block 26 may be closed by a slide 25, adapted to engage the retaining-flange 24 in the same manner in which it was engaged by the tube 23.

In order to make it possible to get at the interior of the camera, I secure the inclosing casing A to the base A' by means of a series of spring-actuated bolts 38 38, adapted to engage apertures formed in the said casing A. The bolts 38 38 are arranged in suitable recesses and have coiled springs 37 37 inserted in said recesses behind the bolts. In the apertures formed in the casing A are inserted press buttons or knobs 39 39, which engage the ends of the bolts 38 38 and may be employed to force the said bolts inwardly to a sufficient extent to release the casing A from the base. To render it easy to put the casing A in position upon the base, the ends of the bolts 38 are preferably beveled upwardly. Thus in applying the casing A to the base it is only necessary to force the same downwardly against the beveled ends of the bolts 38, when they will snap into engagement with the apertures in said casing and lock the parts together. The camera may be provided with the usual means for mounting it upon a tripod T and may also have suitable carrying means, as found most convenient.

While I have illustrated mirrors in the drawings for the purpose of reflecting the images through the lens, I do not wish to confine myself to this precise means, since I may employ other reflecting materials, such as prisms or the like, without departing in the least from the spirit of the invention.

The operation of the device is somewhat as follows: The casing A is removed, and a spool containing a roll of sensitive film is put into position upon the block 10 and locked in place by the cover 11. The end of the film is then led between the rollers 6 6 and around the one adjacent to the said spool, thence around the annular flanges 2 2 of the plates 1 and 15, back between the rollers 6 6, and around an empty spool upon the other end of the block 10. By winding the spool 7 by means of the key 13 the film may be changed from time to time to present different portions of its surface to the action of the lens. The casing A is then put into position, and the top reflector D is inserted in its proper place. The lens-actuating mechanism is then set, and all is in readiness for a proper exposure. After the camera has been set in place the press-button 41 is pushed inwardly, so as to release the gearing in the casing 35, when the lens will be rotated so as to sweep the whole area of the film exposed in the camera. The shutter will operate, as above described, to close the end of the tube 18 before and after the exposure. The film may then be wound to a sufficient extent to expose a new surface for the next picture, when the operation may be repeated. The film will be easily carried around in the camera by the plates 1 and 15, which engage at their edges the antifriction-rollers 5 5.

The parts of the mechanism are comparatively simple and are easily operated, and pictures may be taken covering the whole sweep of the horizon.

Having now described my invention, what I claim as new, and desire to secure by Letters Patent, is—

1. A camera having a stationary casing, adjustable means engaging each edge of the film for movably holding the successive parts thereof in a cylindrical form, and reflecting means mounted within said casing and adapted to be rotated so as to transmit rays of light from every point of the horizon to every part of the film exposed.

2. A camera having a stationary casing, means engaging the upper edge of the film and means for engaging the lower edge of the film for holding the said film in a cylindrical form in the camera-casing, and a reflecting means adapted to be completely revolved within the cylindrical portion of the film for directing rays of light to the whole circle of the film exposed, whereby a panoramic picture sweeping the whole horizon may be taken.

3. A camera comprising an inclosing casing, means for properly holding a film in position around the walls of the said casing comprising antifriction revolving plates, a revoluble lens mounted within the film, and means for rotating the same, flaring tubes arranged upon each side of the lens, one of said tubes being formed with an elbow so that the same may extend outside the camera-casing at right angles to the axis of the lens, reflecting-mirrors mounted in the said elbow-tube for reflecting light into the camera and through the lens, the structure being such that by revolving the lens and tubes images received from all points of the horizon may be transmitted to the film within the camera, substantially as described.

4. In a camera the combination with an inclosing casing of means for supporting a film therein, rotating reflecting mechanism mounted within the film, a shaft carrying the said mechanism, a spring for actuating the same, gearing for transmitting movement from the spring to the shaft and frictional means for controlling the speed of the gearing, substantially as described.

5. In a camera the combination with film-holding means of a revoluble lens for acting upon the same, a shaft carrying the said lens, a spring for rotating the shaft, a brake-wheel for regulating the speed of the shaft, intermediate gearing connecting the brake-wheel with the said shaft, an adjustable brake-band for engaging the brake-wheel for varying the speed of the shaft, and means for holding and releasing the shaft-gearing substantially as described.

6. In a camera, the combination with a casing of a film-holding mechanism mounted therein, comprising a frame for holding film-spools, and rotating disks for holding a portion of the said film in the form of a cylindrical loop within the camera, inwardly-extending annular flanges upon the said disks for engaging the edges of the film, means for supporting the lower disk upon a central support, and means for engaging the periphery of the upper disk for revolubly holding the same in position without a central support, a lens mounted within the loop of the film, and means for revolving the same whereby it is caused to act upon every portion of the said loop, substantially as described.

7. In a camera the combination with the casing of film-supporting means mounted therein comprising a frame having a central standard, pivoted plates mounted thereon for engaging and revolubly holding film-spools, springs for holding the said plates in engagement with the said spool, a key for turning one of the spools for winding the film, antifriction-rollers also mounted upon the said frame for guiding the film to the center of the camera, and film spreading and supporting disks adapted to hold a portion of the film in the form of a cylindrical loop, a hub for pivotally supporting the lower disk, a series of standards arranged in the camera and provided with pairs of antifriction-rollers for engaging the edge of the upper disk, edge-engaging rollers also mounted on said standards for properly centering the said upper plate, some of the said standards also having antifriction-rollers engaging the periphery of the lower plate, and means for transmitting reflected light to every part of the film-loop, substantially as described.

8. In a camera the combination with means for holding a film in a loop form, of reflecting means for directing reflected light to the said loop so as to affect every part thereof, and a shutter movably mounted in the camera and adapted to prevent the entrace of light through the reflecting means before it starts on its revolution in the camera, the said shutter awaiting the arrival of the said reflecting means at the finish of its movement and again operating to shut off rays of light introduced by the said reflected means, substantially as described.

9. A camera comprising a casing adapted to have a film mounted therein, a rotating lens arranged within the camera and film, a tube for directing rays of light to every portion of the film in the lens, an adjustable shutter adapted to close the end of the tube before it commences to rotate, the said shutter also closing the tube at the end of its rotation but moving to one side of its original position, so as to expose the portion of the film which it originally covered to the action of the lens and means for limiting the movement of the shutter, substantially as described.

10. In a camera the combination with a suitable casing of means for holding a film therein, a rotating lens mounted in the camera, a tube for directing the rays of light from the said lens, a shutter pivotally mounted in the camera, means for rotating the lens in the camera, a little more than a complete revolution at a time, the said shutter shutting off the light which comes through the lens before the lens begins to revolve and then moving to one side of its original point so as to cover the said tube again at the end of its stroke and yet permit every portion of the film to be exposed, a spring secured to the said shutter and adapted to be engaged by a projection upon the said tube whereby the shutter will be automatically caused to adjust itself to the position of the said tube before and after it has made its revolution in the camera, and means for limiting the movement of the said shutter, substantially as described.

11. In a camera the combination with means for holding a film in a loop form therein, of a rotating reflecting means mounted centrally of the camera, a rotating block arranged in the casing for permitting the reflecting means to extend outside of the camera the said block being provided with light-excluding flanges, overhanging corresponding flanges on the casing and means for rotating the said reflecting means, substantially as described.

In testimony whereof I hereunto affix my signature in presence of two witnesses.

DAVID O. BARNELL.

Witnesses:
EDWIN C. BAIRD,
JOHN ZWEIFEL.

It is hereby certified that the assignee in Letters Patent No. 687,592, granted November 26, 1901, upon the application of David O. Barnell, of Omaha, Nebraska, for an improvement in "Panorama-Cameras," should have been described as *The Cosmos Manufacturing Company, of Omaha, Nebraska*, instead of "The Cosmos Manufacturing Company, of Brookline, Massachusetts, a corporation of Massachusetts;" and that the said Letters Patent should be read with this correction therein that the same may conform to the record of the case in the Patent Office.

Signed, countersigned, and sealed this 10th day of December, A. D., 1901.

[SEAL.]

F. L. CAMPBELL,
*Assistant Secretary of the Interior.*

Countersigned:
    F. I. ALLEN,
        *Commissioner of Patents.*